(12) United States Patent
Das

(10) Patent No.: US 11,012,864 B2
(45) Date of Patent: May 18, 2021

(54) MACHINE-LEARNING FRAMEWORK FOR SPECTRUM ALLOCATION

(71) Applicant: Federated Wireless, Inc., Arlington, VA (US)

(72) Inventor: Deepak Das, Lexington, MA (US)

(73) Assignee: Federated Wireless, Inc., Arlington, VA (US)

( * ) Notice: Subject to any disclaimer, the term of this patent is extended or adjusted under 35 U.S.C. 154(b) by 0 days.

(21) Appl. No.: 16/419,636

(22) Filed: May 22, 2019

(65) Prior Publication Data

US 2019/0364433 A1 Nov. 28, 2019

Related U.S. Application Data

(60) Provisional application No. 62/675,355, filed on May 23, 2018.

(51) Int. Cl.
| | |
|---|---|
| *H04W 16/14* | (2009.01) |
| *G06N 20/00* | (2019.01) |
| *H04L 12/26* | (2006.01) |
| *G06N 5/04* | (2006.01) |
| *H04W 88/08* | (2009.01) |

(52) U.S. Cl.
CPC ............ *H04W 16/14* (2013.01); *G06N 5/045* (2013.01); *G06N 20/00* (2019.01); *H04L 43/08* (2013.01); *H04W 88/08* (2013.01)

(58) Field of Classification Search
CPC . H04W 16/14; H04W 72/0453; H04W 24/02; H04W 72/04; H04W 16/10; H04W 24/08
See application file for complete search history.

(56) References Cited

U.S. PATENT DOCUMENTS

| | | | |
|---|---|---|---|
| 2005/0102292 A1* | 5/2005 | Tamayo | G06F 16/951 |
| 2012/0120887 A1* | 5/2012 | Deaton | H04W 16/14 370/329 |
| 2012/0157089 A1* | 6/2012 | Yang | H04L 41/0645 455/424 |
| 2016/0095016 A1* | 3/2016 | El-Refaey | H04W 16/14 370/329 |
| 2016/0330746 A1* | 11/2016 | Mehrabanzad | H04W 4/60 |
| 2019/0364565 A1* | 11/2019 | Hmimy | H04W 36/06 |

* cited by examiner

*Primary Examiner* — Ernest G Tacsik
(74) *Attorney, Agent, or Firm* — Finnegan, Henderson, Farabow, Garrett & Dunner, LLP

(57) ABSTRACT

The disclosed embodiments provide improved methods and systems for predicting spectrum allocation in a wireless access network. The method may comprise receiving data associated with an access point (AP), creating, based on the received data and a machine learning algorithm, a decision model for predicting whether to allocate spectrum to the AP, generating a prediction, using the decision model, whether to allocate spectrum to the AP, and sending the prediction to a spectrum access system (SAS) in the wireless access network. The SAS may be configured to allocate spectrum to the AP based on the prediction.

30 Claims, 7 Drawing Sheets

| Time Stamp | AP operation duration (hr) | AP resource usage in last 10 days (%) | AP in major event location | AP current spectrum usage (MHz) | % of device with timeouts | Other inputs | Spectrum requested? |
|---|---|---|---|---|---|---|---|
| hh:mm:ss DD/MM/YY | 0.2 | 45 | NO | 0 | 0 | ... | YES |
| hh:mm:ss DD/MM/YY | 100 | 92 | NO | 5 | 35 | ... | YES |
| hh:mm:ss DD/MM/YY | 45 | 69 | YES | 5 | 20 | ... | YES |
| hh:mm:ss DD/MM/YY | 2400 | 80 | NO | 20 | 15 | ... | NO |

| Time Stamp | AP operation duration (hr) | AP resource usage in last 10 days (%) | AP in major event location | AP current spectrum usage (MHz) | Backhaul usage in last 10 days (%) | Other inputs | Improvement after spectrum grant? |
|---|---|---|---|---|---|---|---|
| hh:mm:ss DD/MM/YY | 0.2 | 45 | NO | 0 | 0 | ... | YES |
| hh:mm:ss DD/MM/YY | 100 | 92 | NO | 5 | 67 | ... | YES |
| hh:mm:ss DD/MM/YY | 45 | 69 | YES | 5 | 80 | ... | YES |
| hh:mm:ss DD/MM/YY | 2400 | 80 | NO | 20 | 96 | ... | NO |

MACHINE-LEARNING FRAMEWORK FOR SPECTRUM ALLOCATION

CROSS-REFERENCE TO RELATED APPLICATIONS

This application claims the benefit of U.S. Provisional Application No. 62/675,355, filed May 23, 2018, entitled "A Machine-Learning Framework for Spectrum Allocation," which is hereby incorporated by reference in its entirety.

TECHNICAL FIELD

The embodiments in the present disclosure generally relate to systems and methods for predictive learning in a wireless access network and, more particularly, to systems and methods for predicting spectrum allocation in a wireless access network.

BACKGROUND

A network includes a set of interconnected network nodes configured to communicate with one another, for example, over one or more wired or wireless communication links. A network node may be any device configured to communicate over the network, including for example, any type of user equipment (such as mobile devices, computers, smartphones, tablets, laptops, etc.), access points, servers, routers, switches, gateways, or other computing devices connected to the network.

In a conventional network, services that may be provided by a network node are limited based on finite resources, such as processing, storage, and bandwidth, and existing hardware at the node. In practice, the network node typically uses predefined configurations, algorithms, and parameters to allocate its limited available resources to users who access the network through the network node. For example, a network node may be pre-configured to support only a predetermined number of user connections or user requests at a given time based on its finite available bandwidth or processing resources.

The radio frequency (RF) spectrum is the foundation for many wireless access networks in use today, including radar and cellular networks. Specified frequency ranges, sometimes identified as bands or channels, in the RF spectrum may be allocated for use by different entities, for different purposes, or in different geographic locations. As used in this disclosure, "spectrum" generally refers to any frequencies, frequency bands, and frequency channels in the RF spectrum that may be used or allocated for wireless communications.

In view of increasing demand for spectrum, a dynamic spectrum access (DSA) system may be used to share available spectrum in a wireless access network among multiple users who can access the network's data and resources through network nodes with wireless connectivity. A DSA system, for example, may include a Spectrum Access System (SAS) that manages access to a shared spectrum in the wireless network, such as the 3.5 GHz band recently made available for commercial use in the United States. In operation, the SAS may be configured to dynamically allocate available spectrum to one or more network nodes in the wireless network. A network node, such as a base station, access point, server, user equipment, or other network node in the wireless network may request spectrum allocation from the SAS so it may use the allocated spectrum in a wireless access coverage area, e.g., which may be a wireless network or part of a larger network. As used herein, spectrum "allocation" generally refers to any process by which spectrum is allocated, allotted, and/or assigned.

Conventional techniques for allocating spectrum based on static and predetermined wireless-network configurations suffer several shortcomings. For example, resource allocation in such static network configurations is typically determined based on the expected usage of the network, which may be vastly different from the actual usage. This difference may cause network resources, such as spectrum, to be under-provisioned or over-provisioned. Similarly, some prior techniques are based on a reported past usage of network resources, which may not accurately reflect their future usage. Further, conventional networks that rely on aggregate resource-usage metrics do not track or reflect individual users' behaviors. Therefore, such networks cannot effectively provision user-specific resources among the network nodes. Additionally, previous techniques may determine the network configuration based on requests for network resources received from the network nodes. Determining the network configuration in this manner, however, may be time-consuming and may result in inefficient allocation of network resources to the network nodes.

SUMMARY

The embodiments of the present disclosure overcome the disadvantages of the prior art by providing systems and methods for predicting spectrum allocation in a wireless access network. In the disclosed embodiments, a machine-learning-based algorithm ("ML algorithm") may receive and analyze data associated with one or more access points (AP) or other network nodes to predict whether the AP or other node will be requesting spectrum before it actually makes a request for spectrum. In some embodiments, the ML algorithm may provide a prediction and/or recommendation to an SAS regarding spectrum allocation for the AP or other network node. In the disclosed embodiments, for example, the ML algorithm uses a decision model in combination with one or more types of data associated with the AP or other network node to predict and/or recommend spectrum allocation by the SAS. The ML algorithm may generate the decision model, modify the decision model, and/or receive the decision model from an external source. The ML algorithm may be implemented as a standalone or distributed program, and may be part of a larger software module, application, or service running on one or more network nodes. For example, the ML algorithm may be implemented as a cloud-based service. In some embodiments, the ML algorithm may be categorized as predictive, prescriptive, or diagnostic.

According to some illustrative embodiments herein, the ML algorithm may generate a prediction for spectrum allocation based on data associated with an AP, including but not limited to at least one of: SAS analytics, network analytics, user device and application analytics, or social media inputs. By predicting the need for spectrum, the ML algorithm may enable the SAS to optimize its spectrum allocation in the network in advance of receiving new spectrum requests. For example, based on a prediction or recommendation from the ML algorithm, the SAS may be able to switch the AP's allocated frequency or frequencies to different parts of a shared spectrum band, run co-existence algorithms in anticipation of future spectrum allocations, or run propagation analysis in anticipation of future spectrum requests. Accordingly, the SAS may be able to avoid spectrum-crisis situations in the network, avoid user-experience degradations, reduce the SAS's computational burden involved in spectrum allocation, and ease the SAS's burden of satisfying requirements of Service Level Agreements (SLA) for certain users in the network.

Further to certain disclosed embodiments, the ML algorithm may determine whether the SAS should allocate more spectrum to the AP. For example, the AP may be experiencing user-experience and/or performance degradation with its current spectrum assignment(s) from the SAS and may need additional spectrum allocation to support the demands from one or more user equipment accessing the network through the AP. In these situations, the AP may send a request to the SAS to request more spectrum. To effectively mitigate the degradation the AP is experiencing, however, the SAS may need to determine whether more spectrum actually will be useful for the AP, instead of automatically allocating the additional spectrum requested by the AP. The SAS may identify scenarios, for example, where the AP's spectrum request is spurious or where an AP operator is attempting to intentionally destabilize the spectrum sharing and/or coexistence operations of the SAS. For example, a rogue AP may be repeatedly asking for more spectrum, not because the AP needs the spectrum, but because the AP wants to make less spectrum available to other network nodes or users. In accordance with the disclosed embodiments, the ML algorithm may use its decision model to determine whether spectrum allocation, e.g., by the SAS, would improve one or more performance metrics associated with the AP. If the ML algorithm determines that allocating more spectrum to the AP would be useful, the algorithm may send a recommendation to the SAS regarding whether the SAS should allocate more spectrum to the AP and/or an identification of how much or which specific spectrum to allocate.

In some embodiments, the ML algorithm may be configured to optimize certain spectrum allocation performance for the SAS and/or spectrum usage by the network nodes. For example, after receiving an indication of an event, such as an incumbent interference event, a coverage outage, or a capacity outage, that triggers a diagnostic or spectrum optimization, the ML algorithm may implement an attribute-selection algorithm to analyze data associated with at least one AP or another network node. Then, the ML algorithm may determine an attribute that is likely to have caused the triggering event, and send an indication of that attribute to an SAS optimization algorithm. In such exemplary embodiments, the SAS may use the SAS optimization algorithm to optimize the attribute.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 2 is a schematic diagram of a table with exemplary inputs associated with an AP that may be used to train the ML algorithm in the embodiment of FIG. 1, in accordance with certain illustrative embodiments described herein.

FIG. 5 is a schematic diagram of a table with exemplary inputs associated with an AP that may be used to train the ML prescription algorithm in the embodiment of FIG. 4, in accordance with certain illustrative embodiments described herein.

DETAILED DESCRIPTION

Figure 1:
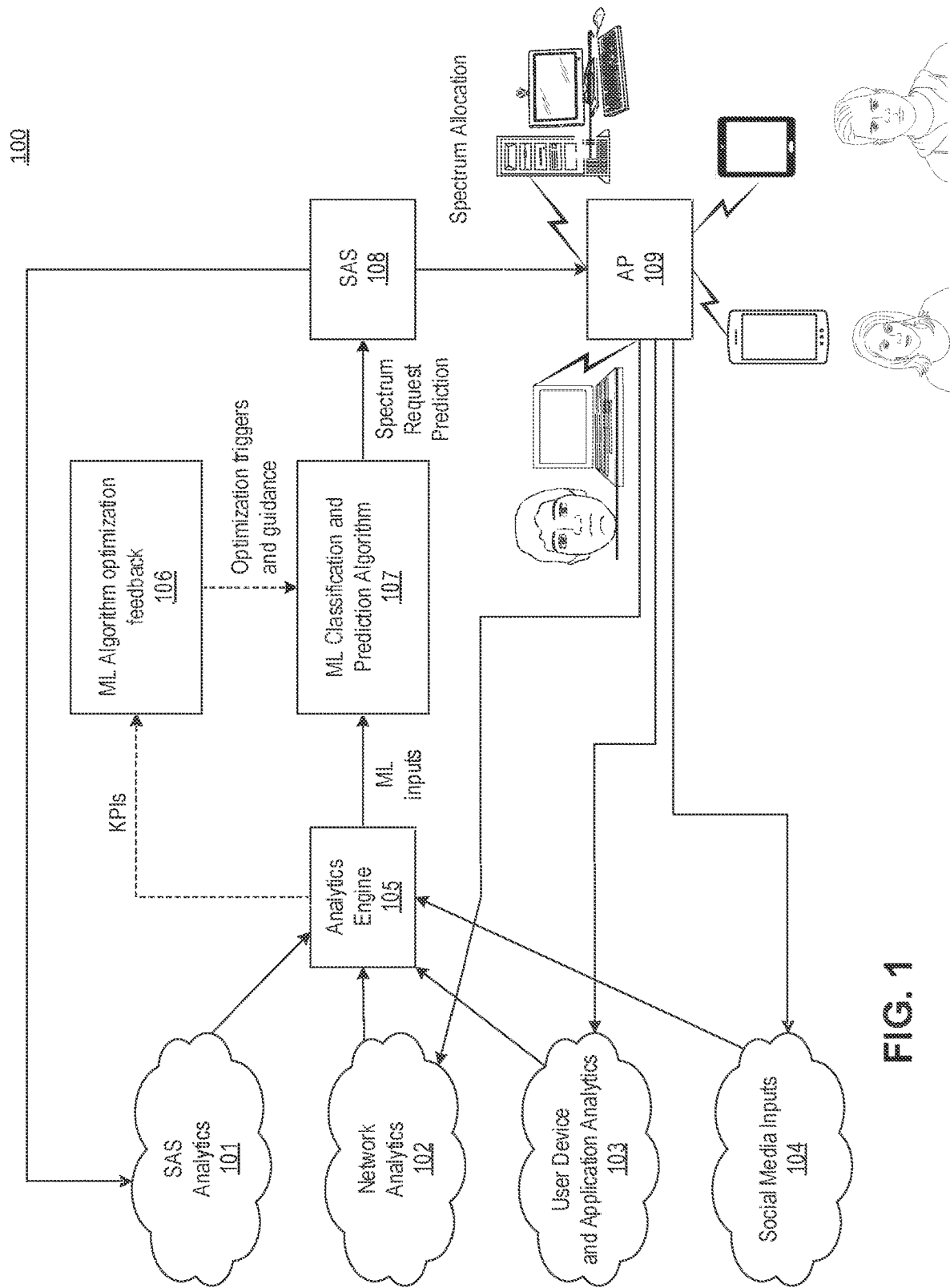
FIG. 1 is a schematic diagram of an exemplary network architecture including an ML prediction algorithm in accordance with certain illustrative embodiments described herein.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is merely exemplary of certain possible implementations and is not intended to limit to full scope of the inventions defined by the appended claims.

FIG. 1 illustrates a schematic diagram of an exemplary network architecture 100 including a SAS analytics 101, network analytics 102, user device and application analytics 103, social media inputs 104, analytics engine 105, ML algorithm optimization feedback 106, ML classification and prediction algorithm 107, an SAS 108, and an AP 109, in accordance with certain illustrative embodiments described herein. ML algorithms are often categorized as predictive, prescriptive, or diagnostic. While FIG. 1 illustrates an exemplary network architecture 100 including an ML prediction algorithm 107, this ML algorithm also may be prescriptive and/or diagnostic.

In some embodiments, the SAS analytics 101, network analytics 102, user device and application analytics 103, social media inputs 104, analytics engine 105, and/or machine learning algorithm optimization feedback 106 may be implemented as cloud-based services. Similarly, in some embodiments, the ML prediction algorithm 107 and/or the SAS 108 may be implemented as cloud services in a cloud-based platform. Users may operate respective user equipment (UE), such as smartphones, tablets, computers, or other computing devices, to access a wireless access network through a network node, such as the AP 109. The UEs may include personal-computing devices such as, for example, general purpose computers, special purpose computers, notebook computers, mobile devices, tablets, smartphone, wearable devices, and any other computing devices that may be used to communicate with the AP 109.

As used herein, the AP 109 may be any entity configured to provide network accessibility to one or more UEs in the wireless access network. The AP 109 may provide, for example, authentication services that enable users to access information or services on a remote server, and may also provide other functions, services, and/or applications to users of the UEs. In some embodiments, the AP 109 may be configured to cache a user's data and provide a cached version of the data when requested by one or more UEs. In addition, the AP 109 may be configured to provide data associated with the AP 109 to at least one of the SAS analytics 101, network analytics 102, user device and application analytics 103, and social media inputs 104. The SAS analytics 101, network analytics 102, user device and application analytics 103, and social media inputs 104 may be configured to store and/or process data associated with the AP 109, e.g., as received from the AP.

Exemplary types of data associated with the AP 109 that may be received and stored by the SAS analytics 101 include, but are not limited to: spectrum request history, current spectrum usage, nature of spectrum allocation, and/or spectrum denial history. Spectrum request history may include information, such as an amount of spectrum requested over a specified, prior time interval. In some embodiments, current spectrum usage may include the current bandwidth allocation associated with the AP 109. In other embodiments, SAS analytics 101 may receive and store information related to the nature of spectrum usage and/or allocation associated with the AP 109, such as whether the spectrum allocation is contiguous or fragmented. In some embodiments, the SAS analytics 101 may receive and store information related to spectrum denial history, including a number of times a spectrum allocation request associated with the AP 109 was denied, e.g., by the SAS 108.

Exemplary types of data associated with the AP 109 that may be received and stored by the network analytics 102 include, but are not limited to: operational history of the AP 109, load history of the AP 109, resource usage of the AP 109, network details associated with the AP 109, performance of the AP 109, and/or connection history associated with the AP 109. Further, data corresponding to the operational history of the AP 109 may include, but is not limited to, a length of time the AP 109 has been operational. Load history of the AP 109 may include, but is not limited to, a duration of time during which the loading on the AP 109 has been above a predetermined threshold, e.g., measured as a percentage. Loading history may also include data indicating a number of active users and/or platform-loading measures, such as buffers, computer processing unit (CPU), etc. Resource usage associated with the AP 109 may include, but is not limited to, a length of time the over-the-air (OTA) resource usage has been above a predetermined threshold for the AP 109. In some embodiments, network details associated with the AP 109 may include an identification of the AP vendor, one or more technology capabilities of the AP 109, an identification of at least one mobile network operator (MNO) available via the AP 109, or other data indicating details associated with the network and its configuration. Data corresponding to performance of the AP 109 may include, but is not limited to, the peak, system, cell-edge, and/or average downlink and uplink data rates over a predetermined, prior time interval. Data corresponding to connection history associated with the AP 109 may include, but is not limited to, a frequency of connections being made by the AP or a frequency of devices "thrashing" (e.g., switching) between different networks using the AP.

Exemplary types of data associated with the AP 109 that may be received and stored by the user and device analytics 103 may include, but are not limited to: application performance, UE statistics, and/or battery life statistics. Application performance information may include, but is not limited to, a number of active applications or performance associated with each application. UE statistics may include, but is not limited to, physical-layer data rates or handover-related statistics. Battery life statistics may include, but is not limited to, battery life degradation rates.

Exemplary types of data associated with the AP 109 that may be received and stored by the social media input 104 may include, but are not limited to, location-based insights, time-based insights, emergency or disaster related insights, and/or insights regarding poor user experience reported by users in connection with one or more social media accessed by users through the AP. Location-based insights may include, but are not limited to, upcoming events, such as sports games, music concerts, etc. at a particular location. Time-based insights may include, but are not limited to, an alarm about an upcoming event, such as an alarm about an upcoming televised sports event. Emergency or disaster related insights may include, but are not limited to, information associated with any upcoming emergency situations, such as flood warnings, hurricane warnings, tornado warnings, amber alerts, fire warnings, etc.

In some embodiments, the SAS analytics 101, network analytics 102, user device and application analytics 103, and social media inputs 104 associated with the AP 109 may be implemented as cloud-based services. In some embodiments, the data received in SAS analytics 101, network analytics 102, user device and application analytics 103, and social media inputs 104 may be aggregated and stored in the analytics engine 105. The analytics engine 105 may, then, provide the above-identified data it has received and/or aggregated associated with the AP 109 to the ML classification and prediction algorithm 107. In some embodiments, the analytics engine 105 and/or the ML algorithm 107 may be implemented as separate cloud-based services; in other embodiments, the analytics engine 105 and ML algorithm 107 may be implemented as part of a common software program, application, or service, e.g., within a single cloud-based service. The ML prediction algorithm 107 may process the machine-learning inputs ("ML inputs") it receives from the analytics engine 105 and provide at least one spectrum-request prediction based on the ML inputs to the SAS 108. In addition to predicting and/or recommending at least one spectrum allocation for the SAS, in some disclosed embodiments the ML algorithm 107 also, or alternatively, may predict and/or recommend spectrum usage.

Figure 3:
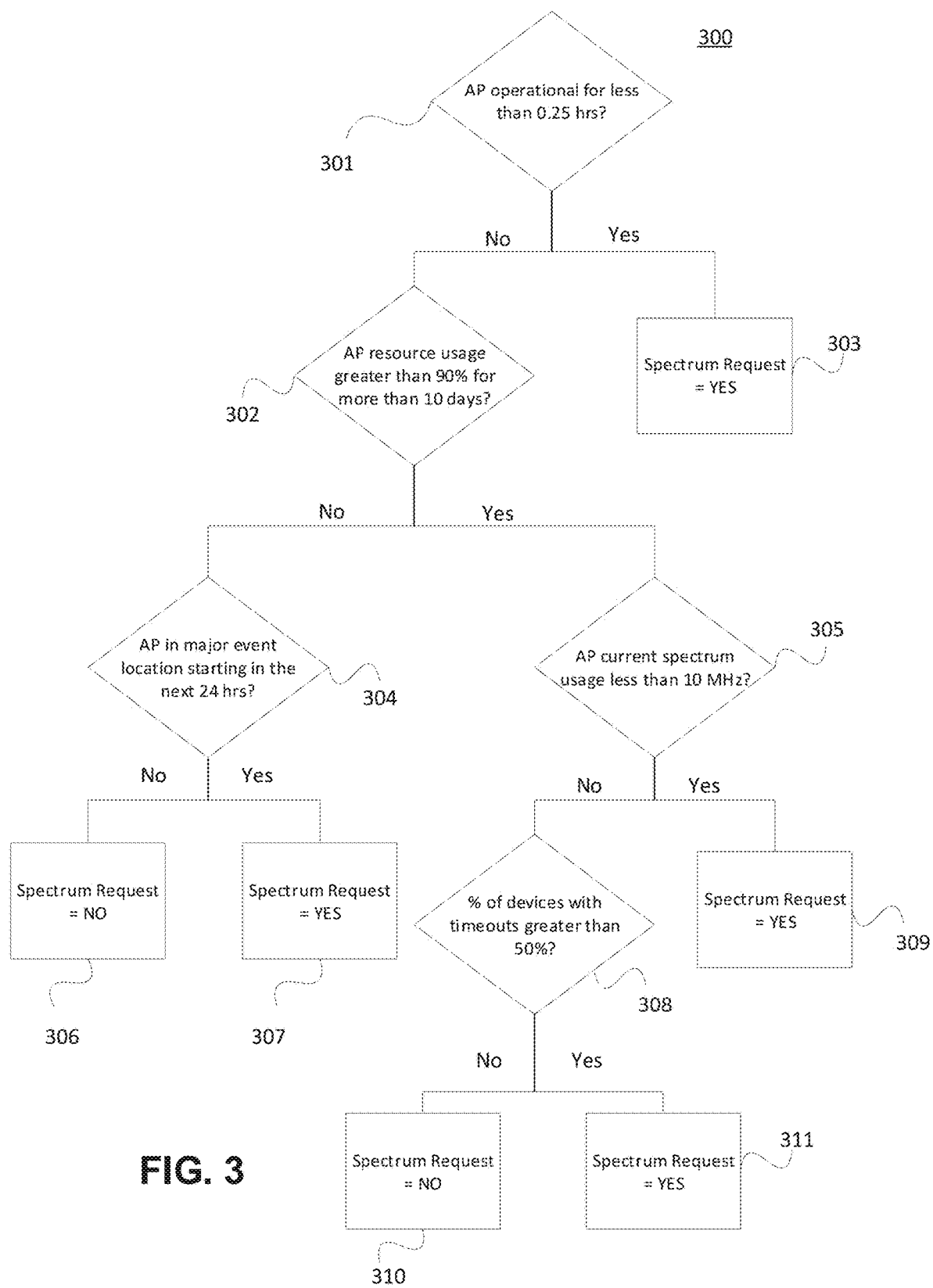
FIG. 3 is a flow chart showing an exemplary decision model for predicting spectrum allocation in a wireless access network, in accordance with certain illustrative embodiments described herein.

According to certain disclosed embodiments, the machine learning prediction algorithm 107 may be trained using received data associated with the AP 109 and a decision model. In some embodiments, the machine learning prediction algorithm 107 may receive data associated with the AP 109 and generate the decision model that can be used to predict whether the AP 109 will be requesting spectrum in the future. In some embodiments, a classification algorithm based on the decision model may be used to train the ML prediction algorithm 107. The decision model for predicting whether to allocate spectrum to the AP may include, but is not limited to, a Decision Tree, C4.5 algorithm, Classification and Regression Trees (CART), or Random Forest algorithm. Those skilled in the art will appreciate that the ML algorithm may use any other decision model consistent with machine-learning analysis. Based on the received data associated with the AP 109, such as the ML inputs received from analytics engine 105, the decision model may generate rules from the data to predict whether the AP 109 will be requesting spectrum allocation. FIG. 3 shows an exemplary decision model that may be generated by the ML algorithm 107 based on a set of exemplary data associated with the AP 109.

FIG. 2 illustrates an example of ML inputs associated with the AP 109 that may be used to train the ML prediction algorithm 107, in accordance with certain illustrative embodiments described herein. In the example shown in FIG. 2, the analytics engine 105 may aggregate data associated with the AP 109, where the data was collected at different times. For example, in FIG. 2, the data associated with the AP may include, but is not limited to, a time stamp, a duration that the AP 109 had been operated as of that time stamp, the AP's resource usage in the last predetermined number of days (e.g., 10 days) preceding the time stamp, whether a major event occurred near the location of AP 109, the current spectrum usage of AP 109 (e.g., in Megahertz), the percentage of UEs connected to the AP 109 with timeouts (e.g., application timeouts), and/or any other data associated with the AP 109. Given the input data associated with the AP 109, the analytics engine 105 may also determine whether spectrum was requested by the AP 109 at each of the times corresponding to the time stamps. In some embodiments, the analytics engine 105 may aggregate data associated with the AP 109 continuously, such as keeping running aggregated statistics for the exemplary input data shown in FIG. 2. In other embodiments, the analytics engine 105 may aggregate data associated with the AP 109 over one or more predetermined time intervals, e.g., determined by a predetermined schedule.

Referring again to FIG. 1, the analytics engine 105 may monitor one or more performance indicators associated with the AP 109 based on the data associated with the AP that it receives from the SAS analytics 101, network analytics 102, user device and application analytics 103, and/or social media inputs 104. For example, the analytics engine 105 may monitor key performance indicators (KPIs) associated with the AP 109 continuously or over one or more predetermined time intervals. The KPIs monitored by the analytics engine may be provided to a machine learning algorithm optimization feedback 106 to optimize the machine learning prediction algorithm 107. In some embodiments, the ML algorithm optimization feedback 106 may be implemented as a separate cloud-based service from the analytics engine 105 and ML prediction algorithm 107, or alternatively, it may be combined with either one or both of the analytics engine 105 and ML prediction algorithm 107.

By way of example, if the analytics engine 105 determines that one or more KPIs are degraded beyond a predetermined threshold, the machine learning algorithm optimization feedback 106 may re-train the machine learning prediction algorithm 107, or send an indication to the ML algorithm 107 indicating that it needs to be re-trained, using the received data associated with the AP 109. The ML algorithm optimization feedback 106, for example, may provide optimization triggers (such as threshold values) and guidance to the ML classification and prediction algorithm 107. In some embodiments, the ML classification and prediction algorithm 107 may be configured to modify, update, and/or replace its decision model based on the data associated with the AP (ML inputs) received from the analytics engine 105.

In some embodiments, if one or more KPIs are degraded beyond a predetermined threshold, the machine learning algorithm optimization feedback 106 may stop the machine learning prediction algorithm 107 from generating further predictions for a predetermined period of time so that the analytics engine 105 may aggregate more data associated with the AP 109. Accordingly, the analytics engine 105 may be able to aggregate more data associated with the AP 109 over the predetermined period of time without the influence of the machine learning prediction algorithm 107. Once sufficient data associated with the AP 109 is aggregated, the analytics engine 105 may input the data to the machine learning prediction algorithm 107 to train the machine learning prediction algorithm 107 until the KPIs monitored are above their predetermined threshold(s).

In some embodiments, the machine learning algorithm optimization feedback 106 may make adaptive modifications to the decision model and/or the machine learning prediction algorithm 107 to optimize the predictions dynamically based on changing environments. For example, any changes to the environment may be tracked and used to dynamically and adaptively modify the decision model and/or the machine learning prediction algorithm 107. In some embodiments, the machine learning algorithm optimization feedback 106 may provide optimization triggers and/or guidance to the machine learning prediction algorithm 107 in order to prompt the machine learning prediction algorithm 107 to modify and/or update the decision model being used to predict whether the AP 109 will be requesting spectrum. Based on the optimization triggers and/or guidance provided by the machine learning optimization feedback 106, the machine learning prediction algorithm 107 may continuously modify and/or update the decision model.

FIG. 3 illustrates an exemplary decision model 300 for predicting spectrum allocation in a wireless access network based on the exemplary data of FIG. 2, in accordance with certain illustrative embodiments. The exemplary decision model 300 in FIG. 3 can be generated, executed, or otherwise performed by one or more combinations of various systems. In some disclosed embodiments, the decision model 300 may be generated and carried out by the machine learning prediction algorithm 107, as shown in FIG. 1, and for this reason, various exemplary elements of FIG. 1 are referenced in explaining this exemplary decision model 300. While decision model 300 described below may be generated and carried out by the machine learning prediction algorithm 107, the decision model 300 may also be generated by other engine(s) or software, such as the analytics engine 105 or the machine learning algorithm optimization feedback 106.

Referring to FIG. 3, decision model 300 may begin at block 301. At block 301, based on the received data associated with the AP 109, the machine learning prediction algorithm 107 may determine whether the AP 109 has been operational for less than a predetermined time period, such as 0.25 hours. If the AP 109 has been operational for more than the predetermined time period, such as 0.25 hours, the machine learning prediction algorithm 107 may proceed to block 303 and predict that the AP 109 will be requesting spectrum. In some embodiments, at block 303, the machine learning algorithm 107 may then send the spectrum request prediction to the SAS 108, such that the SAS 108 can prepare spectrum allocation to the AP 109. In contrast, if the AP 109 has not been operational for more than the predetermined time period, such as 0.25 hours, the machine learning prediction algorithm 107 may proceed to block 302.

At block 302, the machine learning prediction algorithm 107 may determine whether a resource usage of the AP 109 has been greater than a predetermined threshold for more than predetermined time period. By way of example, at block 302, the machine learning prediction algorithm 107 may determine whether a resource usage of the AP 109 has been greater than 90% for more than 10 days. If the resource usage has not been greater than the predetermined threshold, the machine learning prediction algorithm 107 may proceed to block 304. At block 304, the machine learning prediction algorithm 107 may further determine whether there is an unusual event that may have caused the resource usage of the AP 109 to exceed the predetermined threshold. For example, at block 304, the machine learning prediction algorithm 107 may determine whether there is a major event, such as a music concert, starting in the next 24 hours at or near the location of the AP 109 that may have caused the resource usage of the AP 109 to exceed the predetermined threshold. If there is no major event starting in the next 24 hours at or near the location of the AP 109, the machine learning prediction algorithm 107 may proceed to block 306 and predict that the AP 109 will not be requesting spectrum. If there is a major event starting in the next 24 hours at or near the location of the AP 109, the machine learning prediction algorithm 107 may proceed to block 307 and predict that the AP 109 will be requesting spectrum. Then, at block 307, the machine learning prediction algorithm 107 may send the spectrum request prediction to the SAS 108.

At block 302, if the resource usage has been greater than the predetermined threshold, the machine learning prediction algorithm 107 may proceed to block 305. At block 305, the machine learning prediction algorithm 107 may determine whether the current spectrum usage of the AP 109 is less than a predetermined threshold. For example, the machine learning prediction algorithm 107 may determine whether the current spectrum usage of the AP 109 is less than 10 MHz. If the current spectrum usage of the AP 109 is less than 10 MHz, the machine learning prediction algorithm 107 may proceed to block 309 and predict that the AP 109 will be requesting spectrum. Then, at block 309, the machine learning prediction algorithm 107 may send the spectrum request prediction to the SAS 108. In contrast, if the current spectrum usage of the AP 109 is more than 10 MHz, the machine learning prediction algorithm 107 may proceed to block 308. At block 308, the machine learning prediction algorithm 107 may determine a percentage of UEs associated with the AP 109 that has experienced timeouts, such as application timeouts or server timeouts. If the percentage of UEs associated with the AP 109 that has experienced timeouts is greater than a predetermined threshold, such as 50%, the machine learning algorithm 107 may proceed to block 311 and predict that the AP 109 will be requesting spectrum. Then, at block 311, the machine learning prediction algorithm 107 may send the spectrum request prediction to the SAS 108. If, however, the percentage of UEs associated with the AP 109 that has experienced timeouts is less than a predetermined threshold, such as 50%, the machine learning algorithm 107 may proceed to block 310 and predict that the AP 109 will not be requesting spectrum. It is to be understood that the data considered by the machine learning prediction algorithm 107 to generate the spectrum request prediction is not limited to those discussed above with respect to the decision model 300, and that other inputs associated with the AP 109 may also be used to generate the spectrum request prediction.

Figure 4:
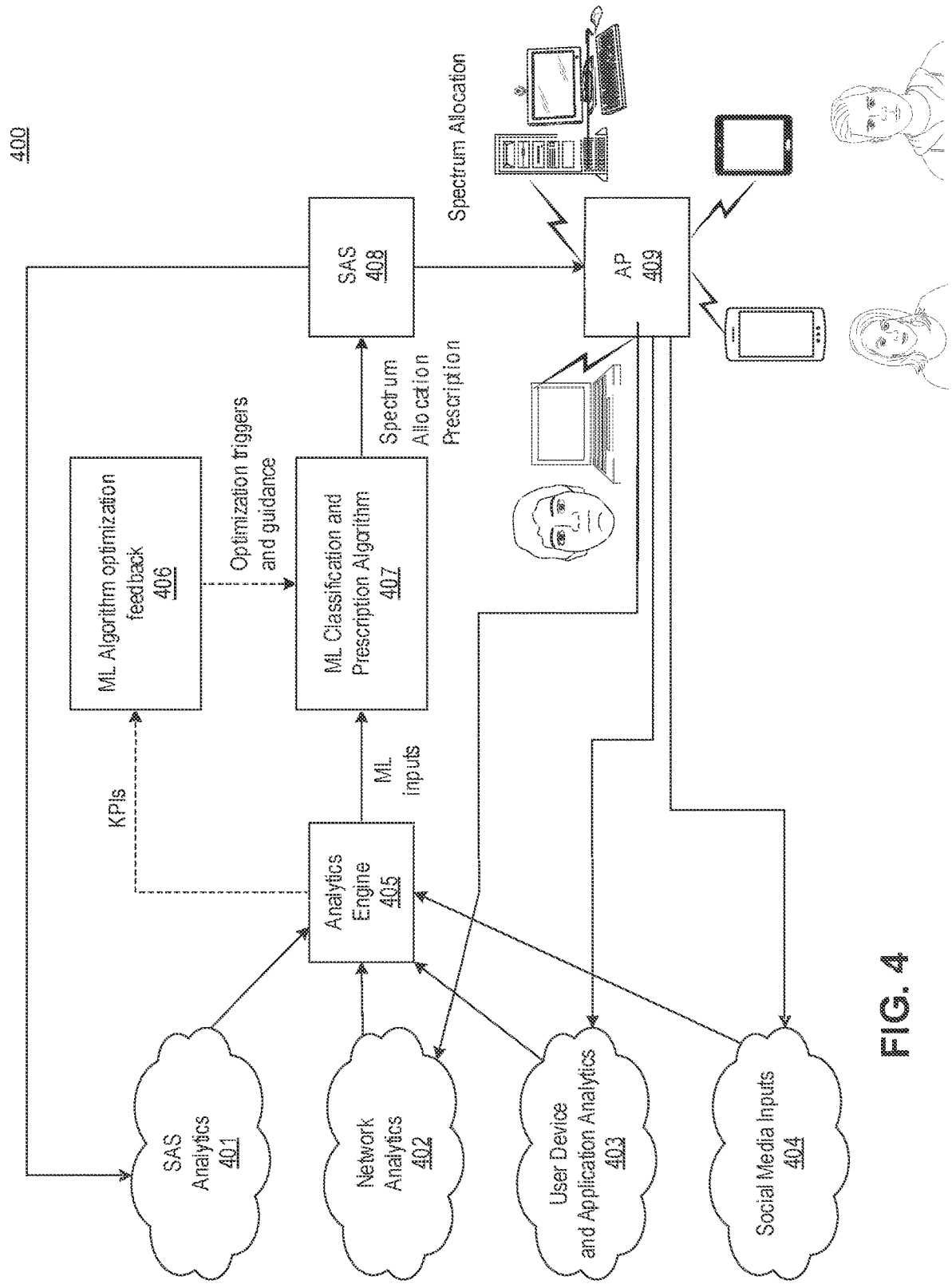
FIG. 4 is a schematic diagram of another exemplary network architecture including a ML prescription algorithm in accordance with certain illustrative embodiments described herein.

FIG. 4 illustrates a schematic diagram of an exemplary network architecture 400 including a SAS analytics 401, network analytics 402, user device and application analytics 403, social media inputs 404, analytics engine 405, ML algorithm optimization feedback 406, ML classification and prescription algorithm 407, an SAS 408, and an AP 409, in accordance with certain illustrative embodiments described herein. While FIG. 4 illustrates an exemplary network architecture 400 including an ML prescription algorithm 407, the ML algorithm also may be categorized as predictive and/or diagnostic.

In some embodiments, the SAS analytics 401, network analytics 402, user device and application analytics 403, social media inputs 404, analytics engine 405, and/or machine learning algorithm optimization feedback 406 may be implemented as cloud-based services. Similarly, in some embodiments, the ML prescription algorithm 407 and/or the SAS 408 may be implemented as cloud services in a cloud-based platform. Users may operate respective user equipment (UE), such as smartphones, tablets, computers, or other computing devices, to access wireless access network through a network node, such as the AP 409. The UEs may include personal-computing devices such as, for example, general purpose computers, special purpose computers, notebook computers, mobile devices, tablets, smartphone, wearable devices, and any other computing devices that may be used to communicate with the AP 409. It is to be understood that the exemplary architecture 400 may be similar to the exemplary architecture 100 in FIG. 1. By way of example, the SAS analytics 401, network analytics 402, user device and application analytics 403, social media inputs 404, analytics engine 405, machine learning algorithm optimization feedback 406, SAS 408, and AP 409 may be the same as the SAS analytics 101, network analytics 102, user device and application analytics 103, social media inputs 104, analytics engine 105, machine learning algorithm optimization feedback 106, SAS 108, and AP 109 in FIG. 1.

Referring to FIG. 4, after spectrum has been allocated to the AP 109, it may be useful for the SAS 408 to determine when more spectrum is going to be useful for the AP 109, especially in order to mitigate any degradation the AP 109 may be experiencing or expecting to happen with its current spectrum assignment. Moreover, it may also be important for the SAS 408 to identify situations, in which a spectrum request from the AP 109 is spurious. For example, the spectrum request from the AP 109 may be a result of an AP operator trying to trick the SAS 408 or destabilize the spectrum sharing and coexistence operations of the SAS 408. By way of example, a rogue AP may repeatedly send spectrum requests, not to use the spectrum for a legitimate purpose, but merely to make less spectrum available to other users. Such destabilizing activity could happen, for example, where the rogue AP is attempting to limit Internet connectivity for genuine APs and the UEs connected to the genuine APs, especially in a security-related situation. As such, it may be useful to implement a machine learning prescription algorithm 407 to determine whether more spectrum will be useful for the AP 409.

As discussed above with respect to AP 109 in FIG. 1, the AP 409 may be any entity configured to provide network accessibility to one or more UEs in the wireless access network. The AP 409 may provide, for example, authentication services that enable users to access information or services on a remote server, and may also provide other functions, services, and/or applications to users of the UEs. In some embodiments, the AP 409 may be configured to cache a user's data and provide a cached version of the data when requested by one or more UEs. In addition, the AP 409 may be configured to provide data associated with the AP 409 to at least one of the SAS analytics 401, network analytics 402, user device and application analytics 403, and social media inputs 404. The SAS analytics 401, network analytics 402, user device and application analytics 403, and social media inputs 404 may be implemented on the cloud and may be configured to store and/or process data associated with the AP 409, e.g., as received from the AP 409.

In some embodiments, the received data associated with the AP 409 may overlap with the received data associated with the AP 109, as discussed above with respect to FIG. 1. Exemplary types of data associated with the AP 409 that may be received and stored by the SAS analytics 401 include, but are not limited to: spectrum request history, current spectrum usage, nature of spectrum allocation, and/or spectrum denial history. Spectrum request history may include information, such as an amount of spectrum requested over a specified, prior time interval. In some embodiments, current spectrum usage may include the current bandwidth allocation associated with the AP 409. In other embodiments, SAS analytics 401 may receive and store information related to the nature of spectrum usage and/or allocation associated with the AP 409, such as whether the spectrum allocation is contiguous or fragmented. In some embodiments, the SAS analytics 401 may receive and store information related to spectrum denial history, including a number of times a spectrum allocation request associated with the AP 409 was denied, e.g., by the SAS 408.

Exemplary types of data associated with the AP 409 that may be received and stored by the network analytics 402 include, but are not limited to: operational history of the AP 409, load history of the AP 409, resource usage of the AP 409, network details associated with the AP 409, performance of the AP 409, and/or connection history associated with the AP 409. Further, data corresponding to the operational history of the AP 409 may include, but is not limited to, a length of time the AP 409 has been operational. Load history of the AP 409 may include, but is not limited to, a duration of time during which the loading on the AP 409 has been above a predetermined threshold, e.g., measured as a percentage. Loading history may also include data indicating a number of active users and/or platform-loading measures, such as buffers, computer processing unit (CPU), etc. Resource usage associated with the AP 409 may include, but is not limited to, a length of time the over-the-air (OTA) resource usage has been above a predetermined threshold for the AP 409. In some embodiments, network details associated with the AP 409 may include an identification of the AP vendor, one or more technology capabilities of the AP 409, an identification of at least one mobile network operator (MNO) available via the AP 409, or other data indicating details associated with the network and its configuration. Data corresponding to performance of the AP 409 may include, but is not limited to, the peak, system, cell-edge, and/or average down link and uplink data rates over a predetermined, prior time interval. Data corresponding to connection history associated with the AP 409 may include, but is not limited to, a frequency of connections being made by the AP 409 or a frequency of devices "thrashing" (e.g., switching) between different networks using the AP 409.

Exemplary types of data associated with the AP 409 that may be received and stored by the user and device analytics 403 may include, but are not limited to: application performance, UE statistics, and/or battery life statistics. Application performance information may include, but is not limited to, a number of active applications or performance associated with each application. UE statistics may include, but is not limited to, physical layer data rates or handover related statistics. Battery life statistics may include, but is not limited to, battery life degradation rates.

Exemplary types of data associated with the AP 409 that may be received and stored by the social media input 404 may include, but are not limited to: location-based insights, time-based insights, emergency or disaster related insights, and/or insights regarding poor user experience reported by users in connection with one or more social media accessed by users through the AP 409. Location-based insights may include, but are not limited to, upcoming events, such as sports games, music concerts, etc. at a particular location. Time-based insights may include, but are not limited to, an alarm about an upcoming event, such as an alarm about an upcoming televised sports event. Emergency or disaster related insights may include, but are not limited to, information associated with any upcoming emergency situations, such as flood warnings, hurricane warnings, tornado warnings, amber alerts, fire warnings, etc.

In some embodiments, the SAS analytics 401, network analytics 402, user device and application analytics 403, and social media inputs 404 associated with the AP 409 may be implemented as cloud-based services. In some embodiments, the data received in SAS analytics 401, network analytics 402, user device and application analytics 403, and social media inputs 404 may be aggregated and stored in the analytics engine 405. The analytics engine 405 may, then, provide the above-identified data it has received and/or aggregated associated with the AP 409 to the ML classification and prescription algorithm 407. In some embodiments, the analytics engine 405 and/or the ML algorithm 407 may be implemented as separate cloud-based services; in other embodiments, the analytics engine 405 and ML algorithm 407 may be implemented as part of a common software program, application, or service, e.g., within a single cloud-based service. The ML prescription algorithm 407 may process the machine-learning inputs ("ML inputs") it receives from the analytics engine 405 and provide at least one spectrum-request prediction based on the ML inputs to the SAS 408. In addition to predicting and/or recommending at least one spectrum allocation for the SAS, in some disclosed embodiments the ML algorithm 407 also, or alternatively, may predict and/or recommend spectrum usage.

Figure 6:
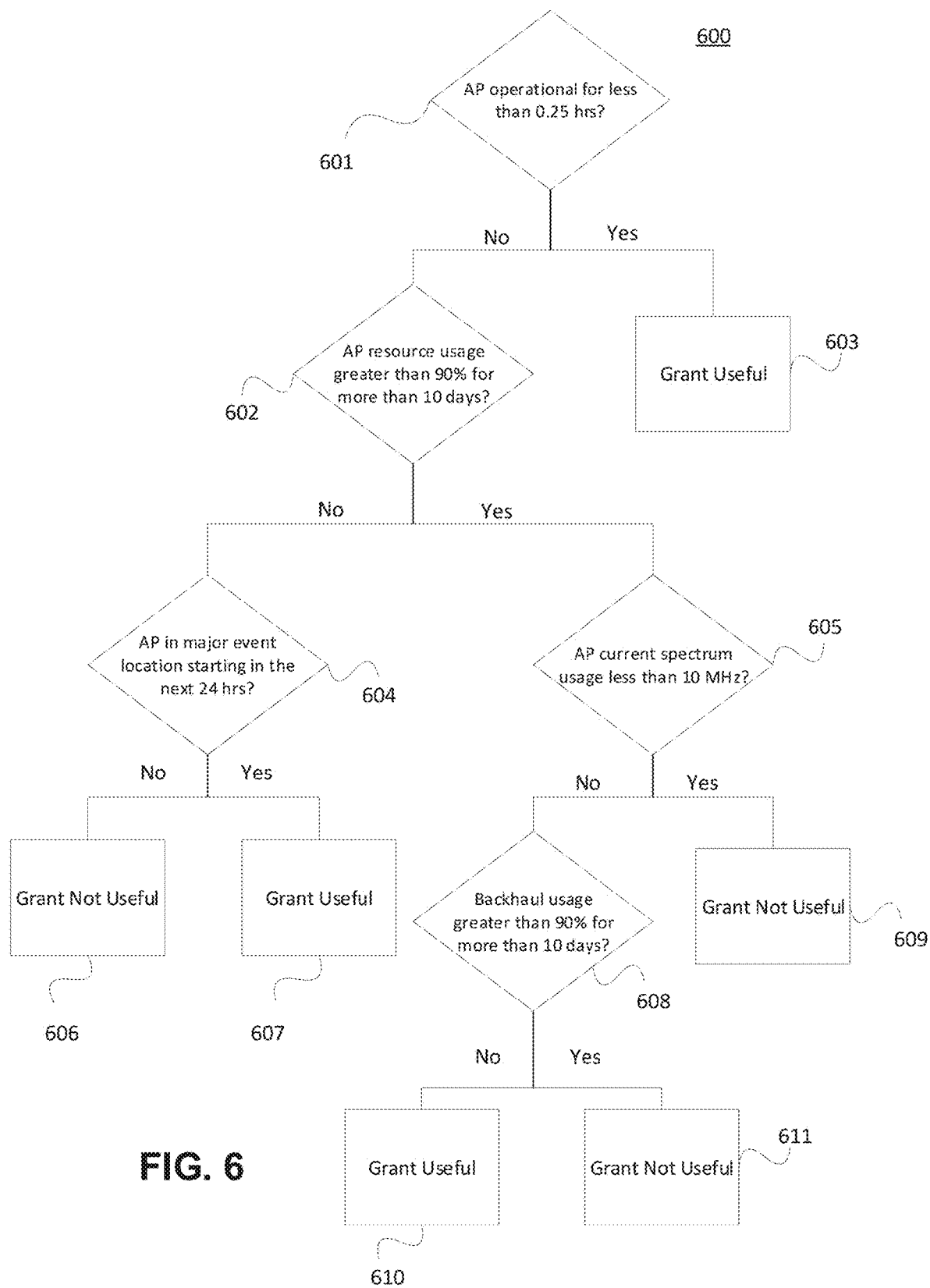
FIG. 6 is a flow chart showing another exemplary decision model for determining whether to allocate more spectrum to an AP, in accordance with certain illustrative embodiments described herein.

According to certain disclosed embodiments, the ML prescription algorithm 407 may be trained using received data associated with the AP 409 and a decision model. In some embodiments, the machine learning prescription algorithm 407 may receive data associated with the AP 409 and generate the decision model that can be used to prescribe (determine) whether allocating more spectrum to the AP 409 will be useful. The decision model generated by the machine learning prescription algorithm 407 may be similar to the decision model 300 generated by the machine learning prediction algorithm 107. In some embodiments, a classification algorithm based on the decision model may be used to train the ML prescription algorithm 407. The decision model for determining whether more spectrum will be useful to the AP 409 may include, but is not limited to, a Decision Tree, C4.5 algorithm, Classification and Regression Trees (CART), or Random Forest algorithm. Those skilled in the art will appreciate that the ML algorithm may use any other decision model consistent with machine-learning analysis. Based on the received data associated with the AP 409, such as the ML inputs received from analytics engine 405, the decision model may generate rules from the data to determine whether more spectrum allocation will be useful to the AP 409. FIG. 6 shows an exemplary decision model that may be generated by the ML algorithm 407 based on a set of exemplary data associated with the AP 409.

FIG. 5 illustrates an example of ML inputs associated with the AP 409 that may be used to train the ML prescription algorithm 407, in accordance with certain illustrative embodiments described herein. In the example shown in FIG. 5, many of the inputs associated with the AP 409 may be similar to the inputs associated with the AP 109 in FIG. 3 that may be used to train the ML prescription algorithm 407. The analytics engine 405 may aggregate data associated with the AP 409, where the data was collected at different times. For example, in FIG. 5, the data associated with the AP may include, but is not limited to, a time stamp, a duration that the AP 409 had been operated as of that time stamp, the AP's resource usage in the last predetermined number of days (e.g., 10 days) preceding the time stamp, whether a major event occurred near the location of AP 409, the current spectrum usage of AP 409 (e.g., in Megahertz), the percentage of backhaul used by the AP 409 in the last predetermined number of days (e.g., 10 days), and/or any other data associated with the AP 409. Given the data associated with the AP 409, the analytics engine 405 may also determine whether spectrum allocated to the AP 409 was useful at each of the times corresponding to the time stamps. For example, based on the inputs associated with the AP 409, the analytics engine 405 may determine whether, in the past, additional spectrum allocated to the AP 409 improved the performance of the AP 409 in each situation. In order to determine whether spectrum allocated to the AP 409 improved the performance, the analytics engine 405 may calculate one or more performance metrics. By way of example, the analytics engine 405 may calculate a first ratio of average system throughput after spectrum allocation to average system throughput before allocation. The analytics engine 405 may also calculate a second ratio of average system throughput with new spectrum allocation to average system throughput with previous spectrum allocation. The analytics engine 405 may calculate a ratio of the first ratio to the second ratio in order to determine whether more spectrum allocated to the AP 409 improved the performance of the AP 409. If the ratio of the first ratio to the second ratio is equal to 1, then the system throughput may have increased proportionally to the additional spectrum allocated to the AP 409. Accordingly, the analytics engine may determine that allocating more spectrum to the AP 409 was useful. If the ratio of the first ratio to the second ratio, however, is less than 1, this would mean that the additional spectrum allocation may not have helped the performance of the AP 409, and thus, the analytics engine 405 may conclude that allocating more spectrum to the AP 409 was not very useful. In other embodiments, performance metric calculated may include, for example, KPIs. In some embodiments, the analytics engine 405 may aggregate data associated with the AP 409 continuously such as keeping running aggregated statistics for the exemplary input data shown in FIG. 5. In other embodiments, the analytics engine 405 may aggregate data associated with the AP 409 over one or more predetermined time intervals, e.g., determined by a predetermined schedule. The inputs associated with the AP 409 described above may be used to train the machine learning prescription algorithm 407.

Referring again to FIG. 4, the analytics engine 405 may monitor one or more performance indicators associated with the AP 409 based on the data associated with the AP that it receives from the SAS analytics 401, network analytics 402, user device and application analytics 403, and/or social media inputs 404. For example, the analytics engine 405 may monitor KPIs associated with the AP 409 continuously or over one or more predetermined time intervals. The KPIs monitored by the analytics engine 405 may be provided to a machine learning algorithm optimization feedback 406 to optimize the machine learning prescription algorithm 407. In some embodiments, the ML algorithm optimization feedback 406 may be implemented as a separate cloud-based service from the analytics engine 405 and ML prescription algorithm 407, or alternatively, it may be combined with either one or both of the analytics engine 405 and ML prescription algorithm 407.

In other embodiments, the analytics engine 405 may determine system throughput before more spectrum allocation and after more spectrum allocation in order to optimize the machine learning prescription algorithm 407. For example, if the system throughput improvement before and after more spectrum allocation, or any other performance metric monitored, is below a predetermined threshold, the analysis engine 405 may re-train the machine learning prescription algorithm 407 using the received data associated with the AP 409. In some embodiments, if the analytics engine 405 determines that the performance metric and/or one or more KPIs are degraded beyond a predetermined threshold, the machine learning algorithm optimization feedback 406 may re-train the machine learning prescription algorithm 407, or send an indication to the ML algorithm 407 indicating that it needs to be re-trained, using the received data associated with the AP 409. The ML algorithm optimization feedback 406, for example, may provide optimization triggers (such as threshold values) and guidance to the ML classification and prescription algorithm 407. In some embodiments, the ML classification and prescription algorithm 407 may be configured to modify, update, and/or replace its decision model based on the data associated with the AP (ML inputs) received from the analytics engine 405. In some embodiments, the machine learning algorithm optimization feedback 406 may stop the machine learning prescription algorithm 407 for a predetermined period of time so that the analytics engine 405 may aggregate more data associated with the AP 409. Accordingly, the analytics engine 405 may be able to aggregate more data associated with the AP 409 over the predetermined period of time without the influence of the machine learning prescription algorithm 407. Once sufficient data associated with the AP 409 is aggregated, the analytics engine 405 may input the data to the machine learning prescription algorithm 407 to train the machine learning prescription algorithm 407 until the performance metric monitored is above their predetermined threshold(s).

In some embodiments, the machine learning algorithm optimization feedback 406 may make adaptive modifications to the decision model and/or the machine learning prescription algorithm 407 to dynamically optimize determinations made by the machine learning prescription algorithm 407 based on changing environments. For example, any changes to the environment may be tracked and used to dynamically and adaptively modify the decision model (such as decision model 600 in FIG. 6) and/or the machine learning prescription algorithm 470. In some embodiments, the machine learning algorithm optimization feedback 406 may provide optimization triggers and/or guidance to the machine learning prescription algorithm 407 in order to prompt the machine learning prescription algorithm 407 to modify and/or update the decision model being used to determine whether allocating more spectrum to the AP 409 will be useful. Based on the optimization triggers and/or guidance provided by the machine learning optimization feedback 406, the machine learning prescription algorithm 407 may continuously modify and/or update the decision model.

FIG. 6 illustrates an exemplary decision model 600 for predicting spectrum allocation in a wireless access network based on the exemplary data of FIG. 5, in accordance with certain illustrative embodiments. The exemplary decision model 600 in FIG. 6 can be generated, executed, or otherwise performed by one or more combinations of various systems. In some embodiments, the decision model 600 may be generated and carried out by the machine learning prescription algorithm 407, as shown in FIG. 4, and for this reason, various exemplary elements of FIG. 4 are referenced in explaining this exemplary decision model 600. While decision model 600 described below may be generated and carried out by the machine learning prescription algorithm 407, the decision model 600 may also be generated by other engine(s) or software, such as the analytics engine 405 or the machine learning algorithm optimization feedback 406.

Referring to FIG. 6, decision model 600 may begin at block 601. At block 601, based on the received data associated with the AP 409, the machine learning prescription algorithm 407 may determine whether the AP 409 has been operational for less than a predetermined time period, such as 0.25 hours. If the AP 409 has been operational for more than the predetermined time period, such as 0.25 hours, the machine learning prescription algorithm 407 may proceed to block 603 and determine that allocating more spectrum to the AP 409 would be useful. In some embodiments, at block 603, the machine learning prescription algorithm 407 may then send a recommendation to the SAS 408 to allocate more spectrum to the AP 409. In contrast, if the AP 409 has not been operational for more than the predetermined time period, such as 0.25 hours, the machine learning prescription algorithm 407 may proceed to block 602.

At block 602, the machine learning prescription algorithm 407 may determine whether a resource usage of the AP 409 has been greater than a predetermined threshold for more than predetermined time period. By way of example, at block 602, the machine learning prescription algorithm 407 may determine whether a resource usage of the AP 409 has been greater than 90% for more than 10 days. If the resource usage has not been greater than the predetermined threshold, the machine learning prescription algorithm 407 may proceed to block 604. At block 604, the machine learning prescription algorithm 407 may further determine whether there is an unusual event that may have caused the resource usage of the AP 409 to exceed the predetermined threshold. For example, at block 604, the machine learning prescription algorithm 407 may determine whether there is a major event, such as a music concert, starting in the next 24 hours at or near the location of the AP 409 that may have caused the resource usage of the AP 409 to exceed the predetermined threshold. If there is no major event starting in the next 24 hours at or near the location of the AP 409, the machine learning prescription algorithm 407 may proceed to block 606 and predict that allocating more spectrum to the AP 409 will not be useful (e.g., will not improve the performance of the AP 409). In some embodiments, at block 606, the machine learning prescription algorithm may send a recommendation to the SAS 408 to not allocate more spectrum to the AP 409. If there is a major event starting in the next 24 hours at or near the location of the AP 409, the machine learning prescription algorithm 407 may proceed to block 607 and determine that allocating more spectrum to the AP 409 would be useful. Then, at block 607, the machine learning prescription algorithm 407 may send a recommendation to the SAS 408 to allocate more spectrum to the AP 409.

At block 602, if the resource usage has been greater than the predetermined threshold, the machine learning prescription algorithm 407 may proceed to block 605. At block 605, the machine learning prescription algorithm 407 may determine whether the current spectrum usage of the AP 409 is less than a predetermined threshold. For example, the machine learning prescription algorithm 407 may determine whether the current spectrum usage of the AP 409 is less than 10 MHz. If the current spectrum usage of the AP 409 is less than 10 MHz, the machine learning prescription algorithm 407 may proceed to block 609 and determine that allocating more spectrum to the AP 409 would be useful. In some embodiments, at block 609, the machine learning prescription algorithm 407 may then send a recommendation to the SAS 408 to allocate more spectrum to the AP 409. In contrast, if the current spectrum usage of the AP 409 is more than 10 MHz, the machine learning prescription algorithm 407 may proceed to block 608. At block 608, the machine learning prescription algorithm 407 may determine a percentage of backhaul being used by the AP 409.

By way of example, at block 608, the machine learning prescription algorithm 407 may determine whether a percentage of backhaul usage by the AP 409 is greater than a predetermined threshold, such as 90%, for more than a predetermined period of time, such as 10 days. If the machine learning prescription algorithm 407 determines that the percentage of backhaul being used is greater than 90% for more than 10 days, the machine learning prescription algorithm 407 may proceed to block 611. At block 611, the machine learning prescription algorithm 407 may determine that allocating more spectrum to the AP 409 would not be useful and may send a recommendation to the SAS 408 to not allocate more spectrum to the AP 409. In contrast, if the machine learning prescription algorithm 407 determines that the percentage of backhaul being used is less than 90% for more than 10 days, the machine learning prescription algorithm 407 may proceed to block 610. At block 610, the machine learning prescription algorithm 407 may determine that allocating more spectrum to the AP 409 would be useful and may send a recommendation to the SAS 408 to allocate more spectrum to the AP 409. It is to be understood that the data considered by the machine learning prescription algorithm 407 to generate the recommendation to the SAS 408 is not limited to those discussed above with respect to the decision model 600, and that other inputs associated with the AP 409 may also be used to generate the recommendation.

In some embodiments, the SAS 408 may receive the recommendation from the machine learning prescription algorithm 407 and follow the recommendation to allocate or not allocate more spectrum to the AP 409. In other embodiments, the SAS 408 may disregard the recommendation from the machine learning prescription algorithm 407 and use a different criteria to determine whether to allocate more spectrum to the AP 409. In yet another embodiment, the SAS 408 may receive the recommendation from the machine learning prescription algorithm 407 and use another criteria in conjunction with the recommendation to determine whether to allocate more spectrum to the AP 409.

As discussed above, after allocating more spectrum to the AP 409, the analytics engine 405 may continuously monitor one or more performance metric associated with the AP 409 in order to optimize the machine learning prescription algorithm 407. For example, the analytics engine 405 may continuously determine performance metrics, such as system throughput improvement after additional spectrum allocation at the AP 409 or KPIs associated with the AP 409, to make sure the performance metric is maintained above a predetermined threshold. If the performance metric falls below a predetermined threshold, the analytics engine 405 may re-train the machine learning prescription algorithm 407.

Figure 7:
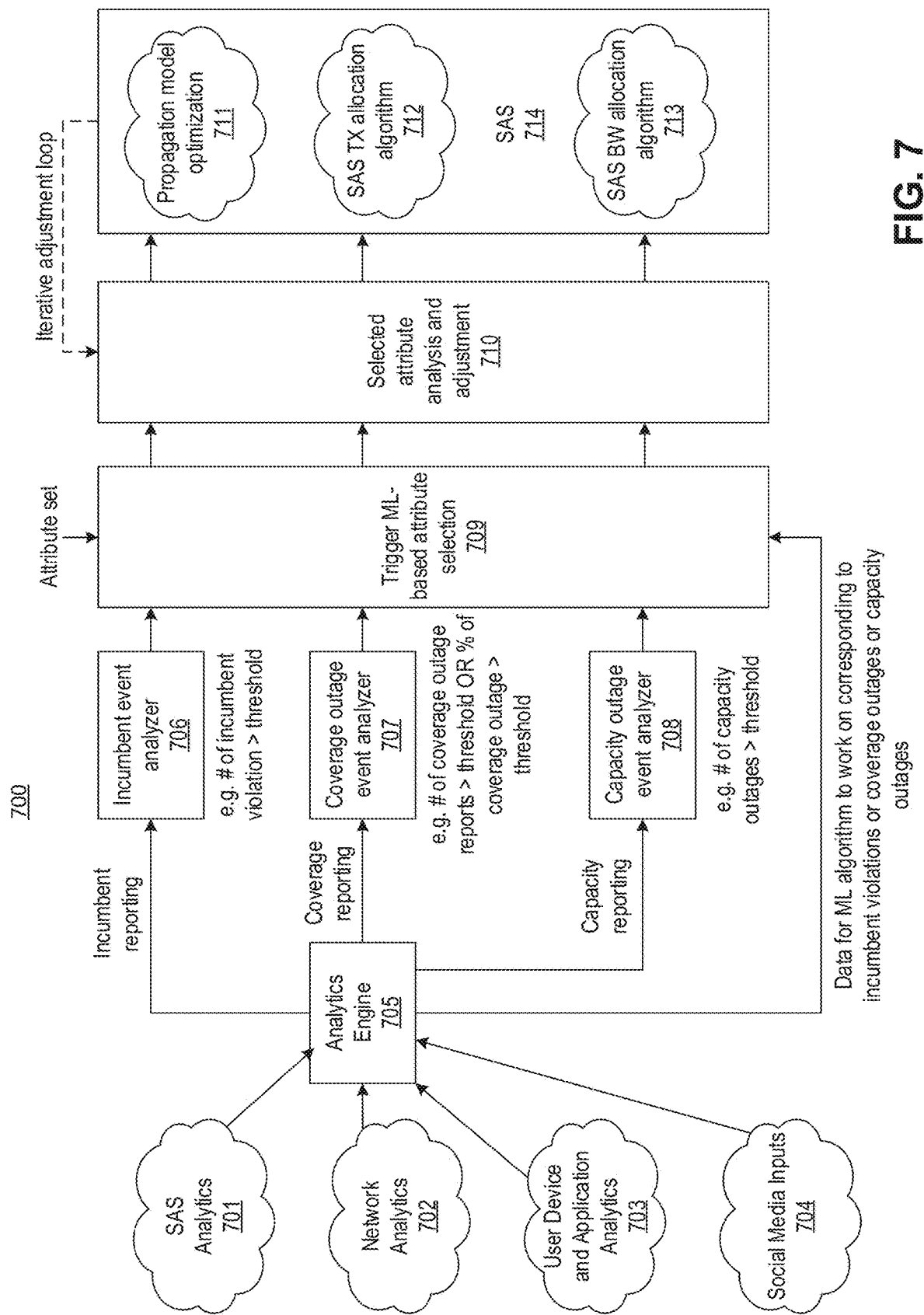
FIG. 7 is a schematic diagram of an exemplary machine-learning framework for optimizing an SAS's spectrum allocation performance, in accordance with certain illustrative embodiments described herein.

FIG. 7 illustrates a schematic diagram of an exemplary ML framework 700 including a cloud-based architecture for optimizing spectrum allocation performance of an SAS, such as the SAS 108 or 408, in accordance with certain illustrative embodiments. To optimize spectrum allocation performance of the SAS, one or more analyzers may be implemented in the cloud-based architecture 700. As seen in FIG. 7, one or more analyzers may include, but are not limited to, an incumbent event analyzer 706, a coverage outage event analyzer 707, and a capacity outage event analyzer 708.

As FIG. 7 shows, the analytics engine 705 may receive input data associated with the AP, such as the AP 109 in FIG. 1 or AP 409 in FIG. 4, from one or more of the SAS analytics 701, network analytics 702, user device and application analytics 703, and/or social media inputs 704. The SAS analytics 701, network analytics 702, user device and application analytics 703, and social media inputs 704 may be the same or similar to the SAS analytics, network analytics, user device and application analytics, and social media inputs described above in connection with FIGS. 1 and 4. For this reason and ease of explanation, the details of the SAS analytics 701, network analytics 702, user device and application analytics 703, and social media inputs 704 are not repeated for FIG. 7. After receiving the input data associated with the AP, the analytics engine 705 may send one or more reports or other summaries, notifications, or messages, to one or more analyzers, such as analyzers 706, 707, and/or 708. For example, in some embodiments the analytics engine 705 may send reports of incumbent interference events, coverage outages, and/or capacity outages associated with the AP to the incumbent event analyzer 706, the coverage outage event analyzer 707, and the capacity outage event analyzer 708, respectively. In some embodiments, a coverage outage may refer to having no accessible wireless network signal in a particular geographical area, either temporarily or permanently. In other embodiments, a coverage outage may refer to having less than an adequate wireless network signal strength (e.g., with a received bit error rate above a threshold value or a signal-to-noise ratio below a threshold value) in a particular geographical area, either temporarily or permanently.

After receiving the reports from the analytics engine 705, the incumbent event analyzer 706, the coverage outage event analyzer 707, and/or the capacity outage event analyzer 708 may identify any triggering events associated with the AP. For example, the incumbent event analyzer 706 may determine whether a number of incumbent events or incumbent violations reported exceed a predetermined threshold. If the number of incumbent events or violations exceeds a predetermined threshold, the incumbent event analyzer 706 may send a trigger to the machine learning based attribute selection algorithm 709. In addition, the coverage outage event analyzer 707 may determine whether the number of coverage outage reports exceeds a predetermined threshold. Additionally, or alternatively, the coverage outage event analyzer 707 may determine whether the percentage of coverage outage events exceeds a predetermined threshold. If the number or percentage of coverage outages exceeds the predetermined threshold, the coverage outage event analyzer 707 may send a trigger to the machine learning based attribute selection algorithm 709. Similarly, the capacity outage event analyzer 708 may determine whether the number of capacity outages exceeds a predetermined threshold. If the number of capacity outages exceeds the predetermined threshold, the capacity outage event analyzer 708 may send a trigger to the machine learning based attribute selection algorithm 709.

In some embodiments, the machine learning based attribute selection algorithm 709 may store a list of one or more attributes that are known to cause various events, such as incumbent events and/or violations, coverage outage events, and/or capacity outage events. The list of attributes may include, but is not limited to, a propagation modeling parameter, a transmission (TX) power, an interference threshold, a portion of a spectrum on which the AP is operating, an AP vendor, a network operator vendor, a network operation parameter, an antenna parameter, a bandwidth allocation, a technology capability of the AP, a floor plan type, a building type, a type of deployment scenario, and an AP location. After receiving a report of a triggering event from at least one of the incumbent even analyzer 706, coverage outage event analyzer 707, or capacity outage event analyzer 708, the machine learning based attribute selection algorithm 709 may analyze each of the attributes in light of all the data associated with the reports relevant to the triggering event that was received from the analytics engine 705. By way of example, if the triggering event is a coverage outage, then the machine learning based attribute selection algorithm 709 may analyze each of the stored attributes in light of all the data associated with every coverage outage reports received by the coverage outage event analyzer 707 from the analytics engine 705. After analyzing each of the attributes, the machine learning based attribute selection algorithm 709 may identify one or more attributes that are most likely to have led to the triggering event, such as a coverage outage event.

In some embodiments, after the one or more attributes have been selected by the machine learning based attribute selection algorithm 709, the machine learning based attribute selection algorithm 709 may send the attribute(s) to the selected attribute analysis and adjustment algorithm 710 for further analysis. The selected attribute analysis and adjustment algorithm 710 may analyze the attribute(s) selected and determine whether the attribute(s) requires optimization. If the selected attribute analysis and adjustment algorithm 710 determines the selected attribute(s) does not require optimization, the selected attribute analysis and adjustment algorithm 710 may stop further optimization. In contrast, if the selected attribute analysis and adjustment algorithm 710 determines that the selected attribute(s) needs to be optimized to mitigate or avoid further incidences of the triggering event in the future, the selected attribute analysis and adjustment algorithm 710 may send the selected attribute(s) to the SAS 714 for further optimization.

The SAS 714 may be implemented in the cloud and may comprise one or more cloud-based algorithms for allocating spectrum to the AP. For example, in some embodiments the SAS 714 may comprise a propagation model optimization algorithm 711, an SAS transmission (TX) allocation algorithm 712, and a SAS bandwidth (BW) allocation algorithm 713. Depending on the attribute(s) selected by the machine learning based attribute selection algorithm 709 and sent by the selected attribute analysis and adjustment algorithm 710, one or more of the propagation model optimization algorithm 711, the SAS TX allocation algorithm 712, and the SAS BW allocation algorithm 713 may optimize the selected attribute(s) to optimize the spectrum allocation performance of the SAS 714, thereby mitigating and avoiding future triggering events. In some embodiments, the optimization process may be iterative. By way of example, one or more of the propagation model optimization algorithm 711, the SAS TX allocation algorithm 712, and the SAS BW allocation algorithm 713 may optimize the selected attribute(s) and confirm whether the attribute(s) has been optimized by sending the attribute(s) back to the selected attribute analysis and adjustment algorithm 710. Then, the selected attribute analysis and adjustment algorithm 710 may analyze the selected attribute(s) again to determine whether the selected attribute(s) has been sufficiently optimized or whether the selected attribute(s) needs to be further optimized. This optimization process may be repeated in an iterative way until the selected attribute(s) has been sufficiently optimized.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware or software alone. Additionally, the disclosed embodiments are not limited to the examples discussed herein. In accordance with the disclosed embodiments, and additional embodiments, of the present disclosure, a computer-readable medium may store instructions that, when executed by one or more processors, causes the processor(s) to perform operations consistent with one or more disclosed methods.

Computer programs based on the written description and methods of this specification are within the skill of a software developer. The various programs or program modules may be created using a variety of programming techniques. For example, program sections or program modules may be designed in or by means of Java, C, C++, assembly language, or any other programming languages. One or more of such software programs or modules may be integrated into a computer system, non-transitory computer-readable media, or incorporated into any software or firmware for execution by one or more processors in a computing system, such as one or more servers or other computers.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps.

It is intended, therefore, that the specification and disclosed embodiments be considered as exemplary only, with the true scope and spirit being indicated by the following claims and their full scope of equivalents.

What is claimed is:

1. A method for predicting spectrum allocation in a wireless access network, the method comprising:
   receiving data associated with an access point (AP), wherein the data comprises social media inputs, and wherein the social media inputs include information reported by a user in connection with one or more social media accessed by the user through the AP;
   creating, based on the received data and a machine learning algorithm, a decision model for predicting whether to allocate spectrum to the AP;
   generating a prediction, using the decision model, whether to allocate spectrum to the AP; and
   sending the prediction to a spectrum access system (SAS) in the wireless access network, wherein the SAS is configured to allocate spectrum to the AP based on the prediction.

2. The method of claim 1, wherein the machine learning algorithm comprises a classification model.

3. The method of claim 1, wherein the decision model for predicting whether to allocate spectrum to the AP comprises at least one of Decision Tree, C4. 5 algorithm, Classification and Regression Trees (CART), or Random Forest.

4. The method of claim 1, wherein the received data associated with the AP further comprises at least one of SAS analytics, network analytics, or user device and application analytics.

5. The method of claim 4, wherein the SAS analytics comprise at least one of spectrum request history, nature of spectrum allocation, or spectrum denial history.

6. The method of claim 4, wherein the networks analytics comprise at least one of operation history associated with the AP, load history associated with the AP, network details associated with the AP, performance of the AP, or connection history of the AP.

7. The method of claim 4, wherein the user device and application analytics comprise at least one of application performance, user equipment (UE) statistics, or battery life statistics.

8. The method of claim 1, wherein the social media inputs comprise at least one of location-based information, time-based information, emergency- or disaster-related information, or information associated with poor user experience reported by users.

9. The method of claim 1, further comprising:
   monitoring key performance indicators (KPIs) associated with the AP; and
   using the machine learning algorithm to update the decision model based on the monitored KPIs.

10. The method of claim 1, further comprising:
    receiving a request for more spectrum from the AP;
    using the decision model to determine whether the SAS should allocate more spectrum to the AP; and
    sending a notification to the SAS in the wireless access network with a recommendation regarding whether the SAS should allocate more spectrum to the AP.

11. The method of claim 10, wherein the received data associated with the AP further comprises a ratio of average-system-throughput after a first spectrum allocation to average-system-throughput before the first spectrum allocation, and a ratio of average-system-throughput after a second spectrum allocation to average-system-throughput before the second spectrum allocation.

12. The method of claim 11, wherein the received data associated with the AP further comprises back-haul congestion data and at least one of SAS analytics, network analytics, or user device and application analytics.

13. The method of claim 10, further comprising:
    monitoring key performance indicators (KPIs) associated with the AP; and using the machine learning algorithm to update the decision model based on the monitored KPIs.

14. The method of claim 1, further comprising:
receiving an indication of at least one of an incumbent interference event, a coverage outage, or a capacity outage associated with the AP;
analyzing, based on an attribute selection algorithm, the received data associated with the AP;
determining an attribute, from the received data, that is most likely to have caused at least one of the incumbent interference event, the coverage outage, or the capacity outage; and
sending the attribute to an SAS optimization algorithm, wherein the SAS is configured to use the SAS optimization algorithm to optimize the attribute.

15. The method of claim 14, wherein the attribute comprises at least one of a propagation modeling parameter, a transmission (TX) power, an interference threshold, a portion of a spectrum on which the AP is operating, an AP vendor, a network operator vendor, a network operation parameter, an antenna parameter, a bandwidth allocation, a technology capability of the AP, a floor plan type, a building type, a type of deployment scenario, or an AP location.

16. A system for predicting spectrum allocation in a wireless access network, the system comprising:
a memory storing instructions; and
a processor configured to execute the instructions to:
receive data associated with an access point (AP), wherein the data comprises social media inputs, and wherein the social media inputs include information reported by a user in connection with one or more social media accessed by the user through the AP;
create, based on the received data and a machine learning algorithm, a decision model for predicting whether to allocate spectrum to the AP;
generate a prediction, using the decision model, whether to allocate spectrum to the AP; and
send the prediction to a spectrum access system (SAS) in the wireless access network, wherein the SAS is configured to allocate spectrum to the AP based on the prediction.

17. The system of claim 16, wherein the machine learning algorithm comprises a classification model.

18. The system of claim 16, wherein the decision model for predicting whether to allocate spectrum to the AP comprises at least one of Decision Tree, C4. 5 algorithm, Classification and Regression Trees (CART), or Random Forest.

19. The system of claim 16, wherein the received data associated with the AP further comprises at least one of SAS analytics, network analytics, or user device and application analytics.

20. The system of claim 19, wherein the SAS analytics comprise at least one of spectrum request history, nature of spectrum allocation, or spectrum denial history.

21. The system of claim 19, wherein the networks analytics comprise at least one of operation history associated with the AP, load history associated with the AP, network details associated with the AP, performance of the AP, or connection history of the AP.

22. The system of claim 19, wherein the user device and application analytics comprise at least one of application performance, user equipment (UE) statistics, or battery life statistics.

23. The system of claim 16, wherein the social media inputs comprise at least one of location-based information, time-based information, emergency- or disaster-related information, or information associated with poor user experience reported by users.

24. The system of claim 16, wherein the processor is further configured to execute the instructions to:
monitor key performance indicators (KPIs) associated with the AP; and
use the machine learning algorithm to update the decision model based on the monitored KPIs.

25. The system of claim 16, wherein the processor is further configured to execute the instructions to:
receive a request for more spectrum from the AP;
using the decision model to determine whether the SAS should allocate more spectrum to the AP; and
send a notification to the SAS in the wireless access network with a recommendation regarding whether the SAS should allocate more spectrum to the AP.

26. The system of claim 25, wherein the received data associated with the AP further comprises a ratio of average-system-throughput after a first spectrum allocation to average-system-throughput before the first spectrum allocation, and a ratio of average-system-throughput after a second spectrum allocation to average-system-throughput before the second spectrum allocation.

27. The system of claim 26, wherein the received data associated with the AP further comprises back-haul congestion data and at least one of SAS analytics, network analytics, or user device and application analytics.

28. The system of claim 25, wherein the processor is further configured to execute the instructions to:
monitor key performance indicators (KPIs) associated with the AP; and
use the machine learning algorithm to update the decision model based on the monitored KPIs.

29. The system of claim 16, wherein the processor is further configured to execute the instructions to:
receive an indication of at least one of an incumbent interference event, a coverage outage, or a capacity outage associated with the AP;
analyze, based on an attribute selection algorithm, the received data associated with the AP;
determine an attribute, from the received data, that is most likely to have caused at least one of the incumbent interference event, the coverage outage, or the capacity outage; and
send the attribute to an SAS optimization algorithm, wherein the SAS is configured to use the SAS optimization algorithm to optimize the attribute.

30. The system of claim 29, wherein the attribute comprises at least one of a propagation modeling parameter, a transmission (TX) power, an interference threshold, a portion of a spectrum on which the AP is operating, an AP vendor, a network operator vendor, a network operation parameter, an antenna parameter, a bandwidth allocation, a technology capability of the AP, a floor plan type, a building type, a type of deployment scenario, or an AP location.

* * * * *